United States Patent
Beerens

(10) Patent No.: US 10,289,517 B2
(45) Date of Patent: May 14, 2019

(54) IDENTIFYING SYSTEM DEVICE LOCATIONS

(71) Applicant: Western Digital Technologies, Inc., San Jose, CA (US)

(72) Inventor: Arne Beerens, Herzele (BE)

(73) Assignee: Western Digital Technologies, Inc., San Jose, CA (US)

( * ) Notice: Subject to any disclaimer, the term of this patent is extended or adjusted under 35 U.S.C. 154(b) by 18 days.

(21) Appl. No.: 15/629,457

(22) Filed: Jun. 21, 2017

(65) Prior Publication Data

US 2018/0373609 A1 Dec. 27, 2018

(51) Int. Cl.
*G06F 11/30* (2006.01)
*G06F 11/32* (2006.01)
*G06F 13/40* (2006.01)
*G06F 3/06* (2006.01)
*G06F 15/177* (2006.01)

(52) U.S. Cl.
CPC ...... *G06F 11/3051* (2013.01); *G06F 11/3006* (2013.01); *G06F 11/3027* (2013.01); *G06F 11/3048* (2013.01); *G06F 11/328* (2013.01); *G06F 13/4022* (2013.01); *G06F 3/0604* (2013.01); *G06F 15/177* (2013.01)

(58) Field of Classification Search
CPC ............. G06F 11/3051; G06F 11/3006; G06F 11/3027; G06F 11/3048; G06F 11/328; G06F 11/3006; G06F 13/4022
See application file for complete search history.

(56) References Cited

U.S. PATENT DOCUMENTS

| 5,826,103 | A | 10/1998 | Whittaker | |
|---|---|---|---|---|
| 6,208,649 | B1 * | 3/2001 | Kloth | H04L 12/467 370/392 |
| 6,401,128 | B1 * | 6/2002 | Stai | H04L 29/12009 709/236 |
| 6,480,889 | B1 | 11/2002 | Saito et al. | |
| 7,471,679 | B2 * | 12/2008 | Lee | H04L 12/1877 370/244 |
| 7,719,969 | B1 * | 5/2010 | Dropps | H04L 47/25 370/229 |
| 7,779,137 | B1 * | 8/2010 | Bali | H04L 41/0663 709/200 |
| 2005/0163118 | A1 * | 7/2005 | Steindl | H04L 29/12254 370/389 |
| 2006/0047907 | A1 * | 3/2006 | Shiga | G06F 3/0605 711/114 |
| 2008/0082699 | A1 | 4/2008 | Alrod et al. | |
| 2013/0311632 | A1 | 11/2013 | Chang et al. | |

* cited by examiner

*Primary Examiner* — Nimesh G Patel
(74) *Attorney, Agent, or Firm* — Patent Law Works LLP

(57) ABSTRACT

Technology for identifying a device location in a system or network includes an example method comprising detecting, by a controller, a device being connected to a location of a set of locations connected to the controller. Responsive to detecting the device, the controller can assign a device identifier (ID) to the device. A device ID may be based on a set of component IDs corresponding to components associated with the device and a component ID may be a system ID, a first controller ID, a first port ID, a first bus ID, or an information ID associated with the device. Further, the device ID can identify the location where the device resides.

20 Claims, 10 Drawing Sheets

IDENTIFYING SYSTEM DEVICE LOCATIONS

BACKGROUND

Field of the Technology

The present disclosure relates to computing networks and, in a more particular non-limiting example, to identifying device location(s) in a system or network.

Description of Related Art

At times, there can be a need to identify and/or determined the location of devices (e.g., Flash device, a disk, enclosure, etc.) in a computing network and/or system. For instance, a device may be to be serviced, replaced, or otherwise require attention. To perform maintenance on a particular device, the location of the device needs first be determined; however, this may present a challenge of its own.

Some computing networks and/or systems may not provide a consistent and/or reliable way of identifying the location of a device utilized therein. Generally, the name of a device cannot be utilized to identify the location because the name of a device can be assigned by an operating system (OS) and a user may be unaware of the assigned name. Even if the user knows the name of a device, an OS can dynamically change the name of a device in the future without the user knowing that such change has occurred, which again can result in the location being unknown because the user no longer knows the name.

Further, knowing the bus location in some OS peripheral component interconnects (PCIs) may be equally unhelpful in determining the location of a device because bus locations can be constructed dynamically by an OS and may change in real-time, which can make bus locations unreliable for use in determining the position of a device within a network and/or system. As such, because previous computing networks and/or systems have based various location techniques on the name of a device and/or a bus location of the device, some previous computing networks and/or systems may use less reliable and/or efficient techniques to locate device(s) utilized therein.

In addition, some current solutions identify devices with an LED next to the device name and/or PCI bus. However, this approach is limited because the LEDs are not unique, and in the case of multiple LED being lit, the lit LEDs are unable to assist a user in truly identifying the location of a single device in the system. For instance, with the many LEDs being lit, a user can be easily confused and select the wrong device.

SUMMARY

The present disclosure describes various aspects for reliably and efficiently identifying device locations in various computer systems, such as computing networks and/or storage systems. In an innovative aspect, a storage system may comprise a set of storage locations; and a first controller including a set of first ports coupleable to the set of storage locations and comprising respective port identifiers (IDs). The first controller includes one or more first processing devices for executing instructions in one or more applications configured to cause the first controller to perform first operations comprising: responsive to detecting a first device being coupled to a first port in the set of first ports, assigning a first device ID to the first device based on a first port ID associated with the first port. The first device ID identifies one of a first physical location and a first virtual location in the set of storage locations for the first device.

In another innovative aspect, a method may comprise detecting, by a first controller, a first device being coupled to a first location of a set of locations coupled to the first controller; and responsive to detecting the first device, assigning a first device identifier (ID) to the first device. The first device ID is based on a set of first component IDs corresponding to first components associated with the first device. A first component ID is one of a first system ID, a first controller ID, a first port ID, a first bus ID, and a first information ID associated with the first device. The first device ID identifies the first location where the first device resides.

These and other implementations may optionally include one or more of the following features, such as, but not limited to: that the first device ID is further based on an information ID for the first device that identifies a device type for the first device; that a first portion of the first device ID includes the first port ID; that a second portion of the first device ID includes the information ID; that the first device ID is further based on an information ID for the first device that identifies a device type for the first device; that a first portion of the first device ID includes the first port ID; that a second portion of the first device ID includes the information ID; that the first device ID is further based on a protocol ID for a protocol coupling the first device and the first port; that a third portion of the first device ID includes the protocol ID; that the first device ID is further based on a protocol ID for a protocol coupling the first device and the first port; that a first portion of the first device ID includes the first port ID; that a second portion of the first device ID includes the protocol ID; responsive to detecting removal of the first device, deleting the device ID; responsive to detecting a second device being coupled to the first port, assigning the device ID to the second device, wherein the first device ID identifies the first physical location in the set of storage locations for the second device; a second controller including a set of second ports coupleable to the set of storage locations and comprising respective port IDs; that the second controller including one or more second processing devices for executing instructions in the one or more applications configured to cause the second controller to perform second operations comprising, responsive to detecting a second device being coupled to a second port in the set of second ports, assigning a second device ID to the second device based on a second port ID associated with the second port; that the second device ID identifies one of a second physical location and a second virtual location in the set of storage locations for the second device; that the first device ID is further based on a first information ID for the first device that identifies a first device type for the first device; that a first portion of the first device ID includes the first port ID; that a second portion of the first device ID includes the first information ID; that the second device ID is further based on a second information ID for the second device that identifies a second device type for the second device; that a first portion of the second device ID includes the second port ID; that a second portion of the second device ID includes the second information ID; that the first device ID is further based on a first protocol ID for a first protocol coupling the first device and the first port; that a third portion of the first device ID includes the first protocol ID; that the second device ID is further based on a second protocol ID for a second protocol coupling the second device and the second port; that a third portion of the second device ID includes the second protocol ID; that the first device ID is further based on a first protocol ID for a first protocol coupling the first device and the first port; that a second portion of the first device ID includes the first protocol ID; that the second device ID is further based on a second protocol ID for a second protocol coupling the second device and the second port; and that a second portion of the second device ID includes the second protocol ID.

The technology disclosed herein provides a number of advantages and benefits over prior solutions, including, but not limited to, being more reliable and/or more efficient than other networks and/or systems, such as those described in the Background, providing hardware and/or software with functionality to avoid or at least decrease the issues related to reliability and/or efficiency associated with locating a device utilized therein. It should be understood that the foregoing advantages and benefits are provided by way of example and that the technology may have numerous further advantages and benefits. Further, it should be understood that the Summary describes various example aspects of the subject matter of this disclosure and is not intended to encompass every inventive aspect.

Other aspects include corresponding methods, systems, apparatus, and computer program products for these and other innovative aspects.

It should be understood, however, that the above list of features is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

So that the advantages of the various embodiments of the technology will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The innovative technology disclosed herein includes various aspects, such as systems, methods, apparatuses, computer-readable media, computer program products, etc., for identifying the location of devices utilized in a network and/or system.

As discussed further herein, the various embodiments disclosed below include hardware and/or software may avoid or decrease issues associated with identifying the location of a device in a network and/or system. These embodiments are advantageously more reliable and/or more efficient than some previous networks and/or systems, such as at times when a device needs servicing, replacement, or otherwise requires attention from a user.

Figure 1:
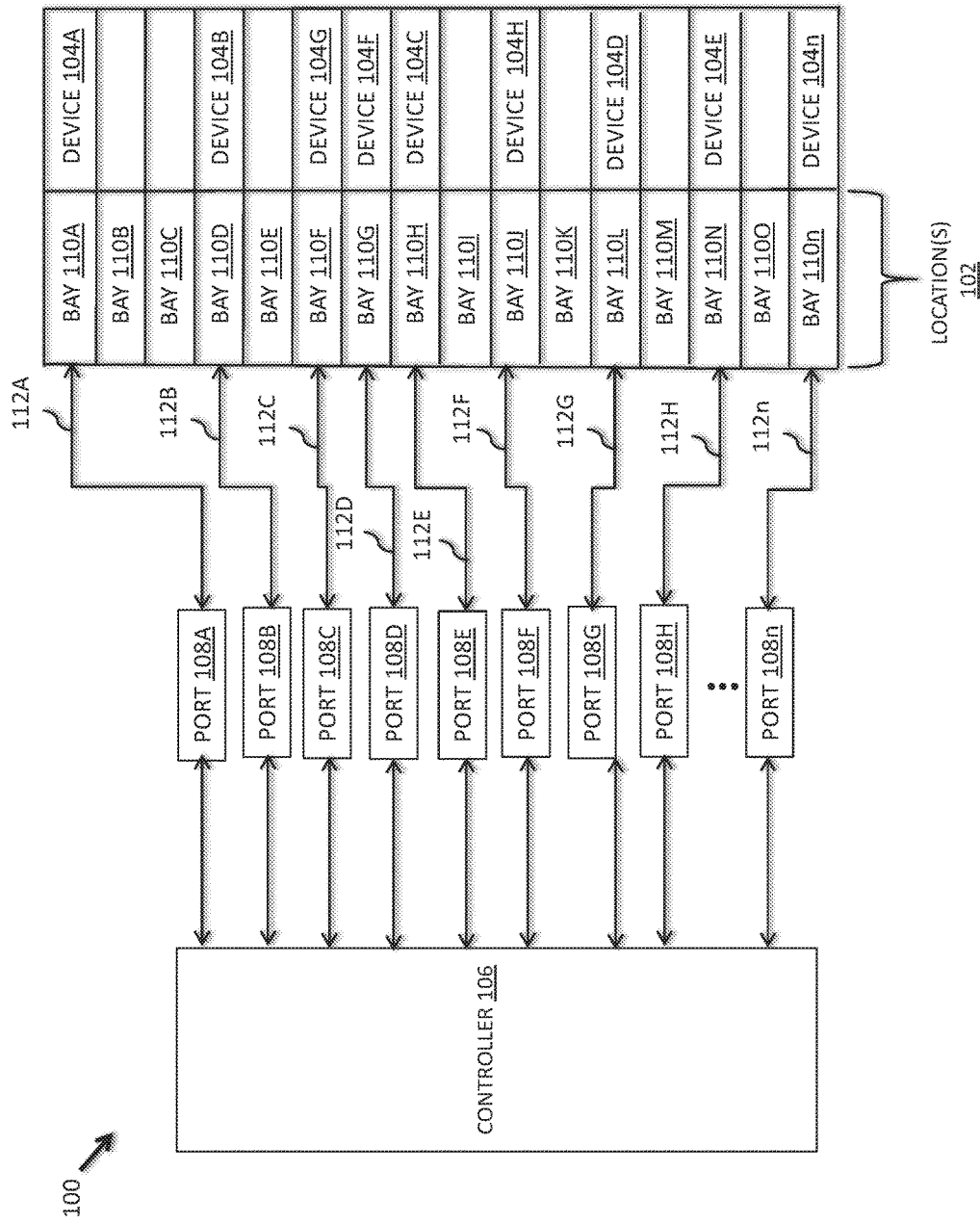
FIG. 1 is a block diagram of an example computing system for identifying a device location in a system or network.

Turning now to the drawings, FIG. 1 is a diagram of an example computing system 100. A computing system 100 may comprise, among other components, a set of locations 102 that can be coupled to and/or in communication with a set of devices 104A, 104B, . . . 104$n$ (also simply referred individually, in various groups, or collectively as device(s) 104). A computing system 100 may further include a controller 106 including a set of ports 108A, 108B, . . . 108$n$ (also simply referred individually, in various groups, or collectively as port(s) 108) that can be coupled to and/or in communication with the location(s) 102 so that the controller 106 may communicate with and/or perform operations on the set of devices 104.

A location 102 may include any type of physical and/or virtual location in a computing system 100 that is known or developed in the future that can physically and/or virtually couple and/or provide/facilitate communication between devices 104 and/or a device 104 and a port 108 of a controller 106, etc. Further, a location 102 may include any suitable type of connection/connector, device, and/or mechanism that is known or developed in the future that can facilitate communication between a device 104 that can be coupled/connected thereto and one or more other devices 104 and/or components of the computing system 100 that can be coupled/connected to the location 102 (e.g., a controller 106 via one of its ports 108, etc.). A suitable connection/connector, device, and/or system may include a structure that can create a communication path and/or communication channel between two or more components (e.g., between device(s) 104 and/or between device(s) 104 a controller 106 via one or more port(s) 108, etc.).

While controllers with ports are described in some embodiments herein with reference to locations, locations are not limited to such and can include other mechanisms (e.g. I/O-chips, providing added functionality, adding another layer of location ID, etc.) in between a controller and the port(s). In further embodiments, a port can be connected to a mechanism that splits/add/expands to multiple subports, such as but not limited to a SAS Expander, which connects to a controller port, multiple ports combined, etc., and expands these into a multitude of subports. Other suitable variations are also possible and contemplated.

With respect to a virtual location, such as virtualized components of a virtual machine, emulating hardware, a location may similarly be determined for virtual hardware devices in the virtual machine. Non-limiting examples of virtual machine technology may include Virtual Box, VMWare, etc.

As shown, a location 102 may comprise an enclosure with a set of bays 110A, 110B, . . . 110$n$ (also simply referred individually, in various groups, or collectively as bay(s) 110), although other types of locations/devices (e.g., storage devices, etc.), servers (e.g., blade servers, etc.), and/or systems (e.g., storage systems, etc.) are possible and contemplated herein. While FIG. 1 illustrates location 102 as an enclosure including sixteen (16) bays 110, various other embodiments may include a greater quantity of locations 102 and/or fewer quantities or greater quantities of bays 110 such that a system 100 is not limited to one (1) location 102 (e.g., enclosure, server, rack, etc.) and/or sixteen (16) bays 110. A bay 110 may be any suitable type of bay, slot, connector, etc. of a computing enclosure or other suitable type of device and/or location 102 that is known or developed in the future.

While locations 102 are illustrated as being a set of bays 110 in an enclosure, various other embodiments may include other types of locations 102 such that a location 102 is not limited to a bay 110 and/or an enclosure. Non-limiting examples of other types of location 102 may include, but may not be limited to, an enclosure with a set of slots, a rack, a server, a memory device/system, a storage device/system, etc., and/or any physical location 102 and/or virtual location 102 that may be and/or can accommodate a device 104 and/or within which a device 104 can reside and communicate via a bus 112, as discussed elsewhere herein.

Locations 102, in various embodiments, may be the same type of location 102 or at least two (2) locations 102 can be different types of location 102. For instance, a first location 102 may be a blade slot in a rack and a second location 102 may be a bay 110 in an enclosure, among other types of location 102 and/or combinations that are possible and contemplated herein.

In some embodiments, a location may be an empty location, such as a bay without a device attached, a location that intended to remain unallocated, or another suitable configuration. In these embodiments, a location can be constructed without a device attached to it.

A device 104 may be any suitable type of component in a computing system 100, computer-usable storage medium, apparatus, and/or system, etc., that is known or developed in the future that can be coupled to and/or in communication with one or more other components and/or device(s) 104 of a computing system 100 via a location 102. Non-limiting examples of a device 104 may include, but may not be limited to, a hard disk, a blade, a portable computer diskette, a random access memory ("RAM") device, a read-only memory ("ROM") device, an erasable programmable read-only memory ("EPROM" or Flash memory) device, a static random access memory ("SRAM") device, a portable compact disc read-only memory ("CD-ROM"), a digital versatile disk ("DVD"), a memory stick, a floppy disk, a mechanically encoded device such as punch-cards or raised structures in a groove having instructions recorded thereon, a tape drive, and/or any suitable combination of the foregoing, among other types of device that are possible and contemplated herein. Further example devices 104 may include, but are not limited to, Solid State Drives (SSDs), Solid State Hard Disks (SSHDs), USB drives (flash), DIMMs, etc.

A computer-usable (e.g., readable, writable, modifiable, etc.) storage medium may include any non-transitory and/or persistent apparatus or device that can contain, store, communicate, propagate, and/or transport instructions, data, computer programs, software, code, routines, etc., for processing by or in connection with an instruction/operation execution and/or processing device (e.g., a controller 106, a hardware processor, a hardware/software processor, etc.). For instance, a computer-usable storage medium may be, but may not be limited to, an electronic storage device, a magnetic storage device, an optical storage device, an electromagnetic storage device, a semiconductor storage device, or any suitable combination of the foregoing, among other tangible types of storage mediums that are possible and contemplated herein. As used herein, a computer-usable storage medium is not to be construed as being transitory signals per se, such as, for example, radio waves or other freely propagating electromagnetic waves, electromagnetic waves propagating through a waveguide or other transmission media (e.g., light pulses passing through a fiber-optic cable), or electrical signals transmitted through a wire, and/or the like waves/signals.

A computing system 100 may include any suitable quantity of devices 104 residing at location(s) 102. As shown, the set of devices 104 includes nine (9) devices 104; however, few or greater quantities of devices 104 are possible and contemplated herein such that a computing system 100 may not be limited to nine (9) devices 104.

A device 104 may include an identifier, which can be referred to herein as a device ID. A device ID, in various embodiments, may include a set of portions comprising one or more identifiers from one or more other components in a computing system 100 with which a device 104 is associated, as discussed elsewhere herein. In some embodiments, a device ID can identify the location 102 at which a device 104 resides, which can decrease the amount of time it takes to locate the device 104 (e.g., at servicing, replacing, or otherwise needing attention, etc.).

A device ID may be assigned by a controller 106 and/or a user of the system 100, etc., among other possibilities that are contemplated herein. In some embodiments, a device ID may include one or more alphanumeric characters and/or other type of descriptor, although other identifiers/descriptors are possible and contemplated herein.

In various embodiments, a device ID can be used to identify a device 104 at a particular location 102, even in situations when the device 104 may be swapped out with a different device 104, as discussed elsewhere herein. For instance, because a device ID is based on and/or may be used to identify the location 102 of a device 104, any device 104 that resides at the location 102 can include the same device ID while it is occupying the location 102. Further, when not occupying a location 102 (e.g., before and/or after occupancy), a device 104 may include a different device ID than when it occupies the location 102.

A location 102 including a device 104 coupled/connected to or otherwise occupying the location 102 can be further coupled to one or more ports 108 of a controller 106 via one or more buses 112. For instance, a set of buses 112A, 112B, . . . 112n (also simply referred individually, in various groups, or collectively as bus/buses 112) may be utilized in conjunction with a connection at a location 102 to couple the device(s) 104 and a controller 106.

A bus 112 may be any suitable type of computing bus that is known or developed in future that can facilitate communication between a controller 106 and the device(s) 104, which can include a wired and/or wireless bus 112. Further, a bus 112 may employ any suitable communication architecture and/or protocol that is known or developed in the future. Examples of suitable communication architectures and/or protocols may include, but may not be limited to, InfiniBand (IB), Remote Direct Memory Access (RDMA), IB over RDMA Internet Protocol (IP), Transmission Control Protocol/Internet Protocol (TCP/IP), Ethernet, Fibre Channel (FC), Advanced Technology Attachment (ATA), ATA-over-Ethernet (AoE), parallel ATA (PATA), Serial ATA (SATA), Small Computer System Interface (SCSI), Serial Attached SCSI (SAS), SCSI Enclosure Services, (SES) Internet Small Computer System Interface (iSCSI), an optical network, Network File System (NFS), FC-over-IP (FCIP), Non-Volatile Memory Express (NVMe), NVMeover-RDMA, iSCSI Extensions for RDMA (iSER), SCSI RDMA Protocol (SRP), Fibre Channel-over-Ethernet (FCoE), Enterprise Systems Connection (ESCON), Fibre Connection (FICON), ATA-Over-Ethernet (AoE), and/or Internet Fibre Channel Protocol (IFCP), etc., among other examples of communication architectures and/or protocols and combinations thereof that are possible and contemplated herein.

Further example bus 112 aspects may include, but are not limited to, protocols/connection types (e.g., PCI, PCI-Express, SATA Express, M.2, IDE, ISA, DIMM Slot, Floppy Port, USB port, etc.), non-storage device ports (e.g., AGP, Serial Port (COM), PS/2, Parallel Port (SPP), Printer Port, LPT, Gaming Port, VGA Port, DVI Port, HDMI Port, Display Port (DP), Thunderbolt, etc.).

In some embodiments, a bus 112 may include an identifier, which can be referred to herein as a bus ID. A bus ID may be any type of identifier that is known or developed in the future that can describe one or more characteristics of a bus 112. A bus ID may be assigned by a manufacturer, a controller 106, and/or a user, etc., among other possibilities that are contemplated herein. In some embodiments, a bus ID may describe a type of protocol employed by a bus 112, as described elsewhere herein. As used herein, a bus ID may be represented in a device ID as the reference numeral (e.g., 112A, 112B, . . . 112n, etc.) of its corresponding bus 112. In some embodiments, a type of protocol, as discussed elsewhere herein, may represent a bus 112 in a device ID.

Ports 108A, 108B, . . . 108n (also simply referred individually, in various groups, or collectively as port(s) 108) may be any type of port 108 that is known or developed in the future that can couple its controller 108 to one or more connections at one or more locations 102 via a bus 112 and facilitate communication between one or more devices 104 at the location(s) 102 and the controller 106. In various embodiments, a port 108 may include an identifier, which can be referred to herein as a port ID. A port ID may be assigned by a manufacturer, a controller 106, and/or a user, etc., among other possibilities that are contemplated herein. In some embodiments, a port ID may include one or more alphanumeric characters and/or descriptors (e.g., type of port 108, etc.), although other identifiers are possible and contemplated herein. As used herein, a port ID may be represented in a device ID as the reference numeral (e.g., 108A, 108B, . . . 108n, etc.) of its corresponding port 108.

A controller 106 may comprise any processing hardware and/or software that is known or developed in the future that can perform computer processes, functions, and/or algorithms. A controller 106 may include an identifier, which can be referred to herein as a controller ID. In some embodiments, a controller ID may include one or more alphanumeric characters and/or descriptors, although other types of identifier are possible and contemplated herein. As used herein, a controller ID may be represented in a device ID as the reference numeral (e.g., 106) of its corresponding controller 106.

A controller 106 can provide a device ID to device(s) 104 that can be used to identify a location 102 where a device 104 resides. In various embodiments, a controller 106 can create/generate a device ID based on a set of identifiers (IDs) from one or more components in the computing system 100. In some embodiments, a device ID may include one or more portions that include a controller ID, a port ID, a bus ID, and/or an information ID that describes a device 106 (e.g., type of device 106, etc.) associated with the device ID, etc., among other IDs that are possible and contemplated herein.

In some embodiments, an information ID may be an extra layer of physical identification of location connection. Non-limiting examples of an information may include, but may not be limited to, a group of devices 104 in an enclosure, a SLED (e.g., a diskgroup ID) and/or a controller 106 that includes two (2) or more physical ports 108 with a particular number of connections (e.g., cables) that can provide at least two (2) layers of complexity to a port ID (e.g., the port ID, a connection number, and/or connection ID, etc.).

In further embodiments, a device ID may include an identifier from a component in a computing system 100 (e.g., a port ID, a bus ID, etc.). In further embodiments, a device ID may include an identifier from two (2) components in a computing system 100 (e.g., a port ID, a bus ID, etc.). In additional embodiments, a device ID may include an identifier from three (3) components in a computing system 100 (e.g., a port ID, a bus ID, a controller ID, an information ID, etc.). A device ID, in some embodiments, may include an identifier from four (4) components in a computing system 100 (e.g., a port ID, a bus ID, a controller ID, an information ID, etc.).

In some embodiments, a device ID may include a format that can be similar to the format of a bus location (e.g., <bus>-<ID>, in which the ID represents the identifier for the component), although other formats are possible and contemplated herein. Some non-limiting examples of a device ID for devices 104A through 104n, respectively, based on an ID that can be represented in a device ID by a reference numeral of the component in FIG. 1 may include, but may not be limited to:

bus-112A or bus-108A;
bus-112B or bus-108B;
bus-112E or bus-108E;
bus-112G or bus-108G;
bus-112H or bus-108H;
bus-112D or bus-108D;
bus-112C or bus-108C;
bus-112F or bus-108F; and
bus-112n or bus-108n, among other combinations and/or component IDs that are possible and contemplated herein. Here, the identifiers 112A through 112n may represent a bus ID (e.g., a type of bus, bus protocol, etc.) for the buses 112 or a port ID for the ports 108, as discussed elsewhere herein.

In further embodiments, a device ID may include a format of, <bus>-<ID1>:<ID2>, in which ID1 represents an identifier for a first component and ID2 represents an identifier for a second component), although other formats are possible and contemplated herein. Some non-limiting examples of a device ID for devices 104A through 104n, respectively, based on two (2) IDs that can be represented in a device ID by a reference numeral of the components in FIG. 1 may include, but may not be limited to:

bus-112A:108A or bus-108A:112A;
bus-112B:108B or bus-108B:112B;
bus-112E:108E; or bus-108E:112E;
bus-112G:108G or bus-108G:112G;
bus-112H:108H or bus-108H:112H;
bus-112D:108D or bus-108D:112D;
bus-112C:108C or bus-108C:112C;
bus-112F:108F or bus-108F:112F; and
bus-112n:108n or bus-108n:112n, among other combinations and/or component IDs that are possible and contemplated herein. Here, the identifiers 112A through 112n may represent a bus ID (e.g., a type of bus, bus protocol, etc.) for the buses 112 or a port ID for the ports 108, as discussed elsewhere herein. For instance, a device ID represented above as bus-112A:108A may also be represented as, SATA-108A, in which SATA is a communication protocol employed on bus 112A, among other types of protocols and/or examples that are possible and contemplated herein.

In additional embodiments, a device ID may include a format of, <bus>-<ID1>:<ID2>:<ID3>, in which ID1 represents an identifier for a first component, ID2 represents an identifier for a second component, and ID3 represents an identifier for a third component), although other formats are possible and contemplated herein. Some non-limiting examples of a device ID for devices 104A through 104*n*, respectively, based on three (3) IDs that can be represented in a device ID by a reference numeral of the components in FIG. 1 may include, but may not be limited to:

bus-112A:108A:104A or bus-108A:112A:104A;
bus-112B:108B:104B or bus-108B:112B:104B;
bus-112E:108E:104C; or bus-108E:112E:104C;
bus-112G:108G:104D or bus-108G:112G:104D;
bus-112H:108H:104E or bus-108H:112H:104E;
bus-112D:108D:104F or bus-108D:112D:104F;
bus-112C:108C:104F or bus-108C:112C:104F;
bus-112F:108F:104G or bus-108F:112F:104G; and
bus-112*n*:108*n*:104*n* or bus-108*n*:112*n*:104*n*, among other combinations and/or component IDs that are possible and contemplated herein. Here, the identifiers 104A through 104*n* may represent an information ID (e.g., a type of device 104, etc.) for each of the devices 104A through 104*n*, as discussed elsewhere herein.

A device ID, in some embodiments, may include a format of, <bus>-<ID1>:<ID2>:<ID3>:<ID4>, in which ID1 represents an identifier for a first component, ID2 represents an identifier for a second component, ID3 represents an identifier for a third component, and ID4 represents an identifier for a fourth component), although other formats are possible and contemplated herein. Some non-limiting examples of a device ID for devices 104A through 104*n*, respectively, based on four (4) IDs that can be represented in a device ID by the reference numeral of the component in FIG. 1 may include, but may not be limited to:

bus-106:112A:108A:104A;
bus-106:112B:108B:104B;
bus-106:112E:108E:104C;
bus-106:112G:108G:104D;
bus-106:112H:108H:104E;
bus-106:112D:108D:104F;
bus-106:112C:108C:104G;
bus-106:112F:108F:104H; and
bus-106:112*n*:108*n*:104*n*, among other combinations and/or component IDs that are possible and contemplated herein. Here, the identifiers 106 may represent a controller ID for controller 106, which can be the same identifier in the device IDs for the devices 104.

As discussed elsewhere, the various device IDs can be used to identify a location 102 where a device 106 resides and/or be based on a location 102. Further, a controller 106 can assign a device ID based on the one or more components coupled to a particular location 102, which can be traced/followed to the particular location 102. For instance, a device ID of bus-112E:108E or SATA-108E can be used to identify that device 104C is located at bay 110H since the controller 106 knows that port 108E and/or bus 112E is coupled to and/or in communication with bay 110H, and/or port 108E and/or bus 112E can be traced/followed to bay 110H to find device 104C.

In some embodiments, a controller 106 can map the device IDs to the locations 102 corresponding to where their respective devices 104 reside. The device IDs can be mapped using any mapping technique that is known or developed in the future that can associate a device ID and a corresponding location 102. For instance, a map may be stored in a table, chart, and/or tree, etc., although other mapping techniques are possible and contemplated herein.

Further, a map may be provided to a user so that the user can locate a device 104 using the device ID corresponding to the device 104. For instance, and continuing the above example, the user can use the map to know that the device 104C, which includes a device ID of bus-112E:108E or SATA-108E, is located at the bay 110H since the map can provide an indication that the device ID bus-112E:108E or SATA-108E corresponds to the bay 110H.

Notably, a device ID, as used herein, can also be considered a location ID since it also identifies a location 102 in addition to being a naming convention for a device 104. For instance, in the above example bay 110H may include the same identifier and/or one or more ID portions as device 104C (e.g., bus-108E, bus-112E, bus-108E:112E, bus-112E:108E, etc.). Further, a computing system 100 may utilize a Logical Unit Number (LUN) to identify a location 102 (e.g., a virtual location 102), which can be utilized as at least a portion of a device ID in additional or alternative embodiments.

In various embodiments, a controller 106 can assign any device 104 residing at a particular location 102 the same device ID. For instance and continuing the above example, if device 104C were replaced (e.g., via a hot or cold swap) with a device 104(*n*+1), device 104(*n*+1) may also be assigned bus-108E, bus-112E, bus-108E:112E, or bus-112E:108E, etc., as its device ID while residing in bay 110H since the device ID may correspond to bay 110H, and not necessarily device 104(*n*+1) and/or device 104E. Alternatively, device 104E may include a device ID of bus-108E:104E, bus-112E:104E, bus-108E:112E:104E, or bus-112E:108E:104E, etc., while residing in bay 110H, while device 104(*n*+1) may include a device ID of bus-108E:104(*n*+1), bus-112E:104(*n*+1), bus-108E:112E:104(*n*+1), or bus-112E:108E:104(*n*+1), etc., while residing in bay 110H, in which the difference may be an information ID for devices 104E and 104(*n*+1) (e.g., a type of device 104), which may or may not be the same depending on the types of device 104 for each of devices 104E and 104(*n*+1).

Figure 2:
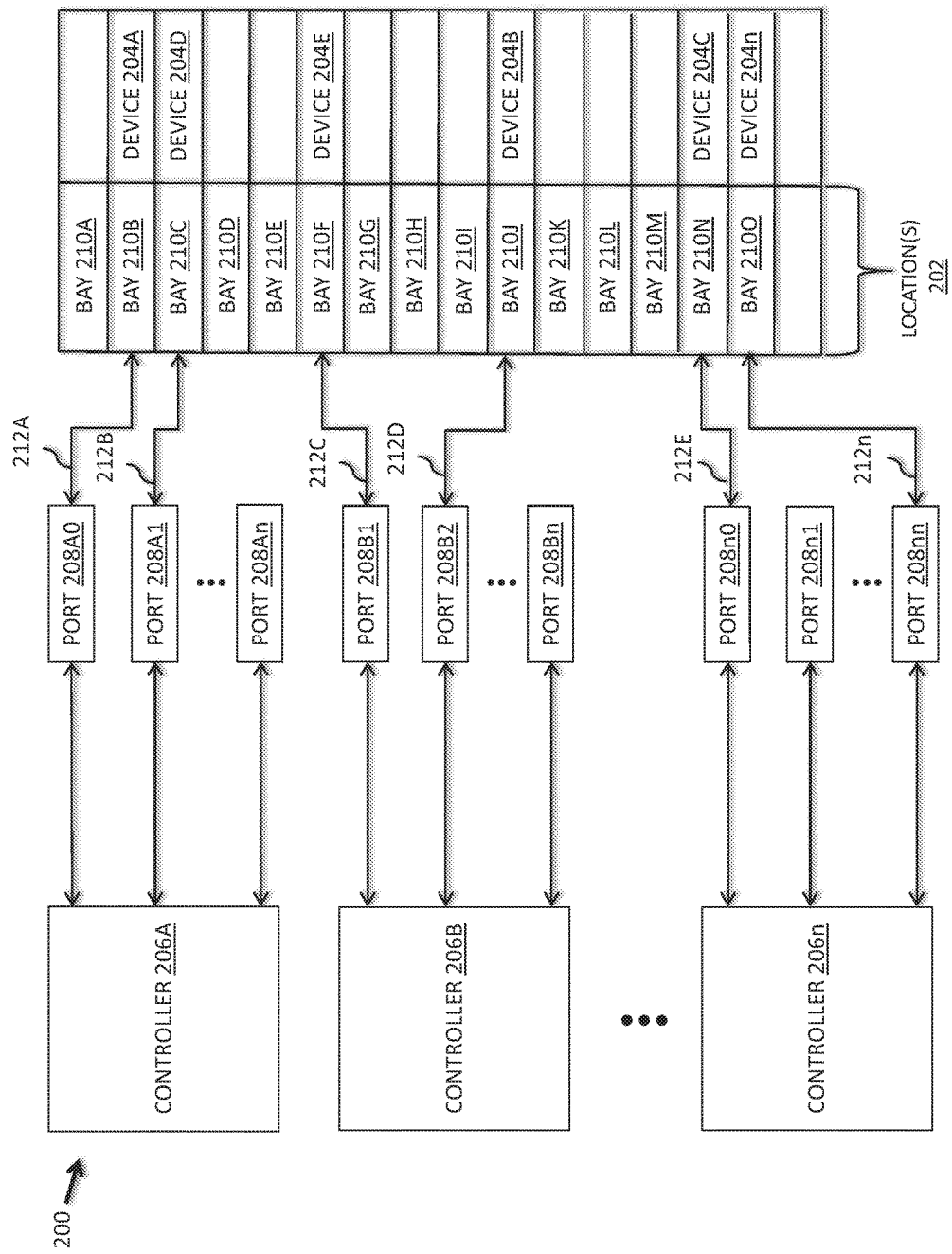
FIG. 2 is a block diagram of another example computing system for identifying a device location in a system or network.

With reference now to FIG. 2, FIG. 2 is a block diagram of another example of a computing system 200. As shown, computing system 200 may include controllers 206A, 206B, . . . 206*n* (also simply referred individually, in various groups, or collectively as controller(s) 206) that can be similar to controller 106 discussed elsewhere herein. Further, controllers 206A, 206B, . . . 206*n* may include a respective set of ports 208A0 through 208A*n*, 208B1 through 208B*n*, . . . 208*n*0 through 208*nn* (also simply referred individually, in various groups, or collectively as ports 208) coupled to and/or in communication with bays 210A, 210B, . . . 210*n* (also simply referred individually, in various groups, or collectively as bay(s) 210) that can be similar to the port(s) 104 and bay(s) 110, respectively, discussed elsewhere herein. Moreover, one or more devices 204*a*, 204B, . . . 204*n* (also simply referred individually, in various groups, or collectively as device(s) 204) may be coupled to and/or in communication with the bay(s) 210 that may be similar to the device(s) 104 discussed elsewhere herein.

A controller 206 can provide a device ID to device(s) 204 that can be used to identify a location 202 where a device 204 resides. In various embodiments, a controller 206 can create/generate a device ID based on a set of IDs from one or more components in the computing system 200. In some embodiments, a device ID may include one or more portions that include a controller ID, a port ID, a bus ID, and/or an information ID that describes a device 206 (e.g., type of device 206, etc.) associated with the device ID, etc., among other IDs that are possible and contemplated herein.

In some embodiments, a device ID may include an identifier from a component in a computing system 200 (e.g., a port ID, a bus ID, etc.). In further embodiments, a device ID may include an identifier from two (2), three (3), or four (4) components (e.g., a port ID, a bus ID, a controller ID, an information ID, etc.), etc. in a computing system 200 that may be similar to other embodiments discussed elsewhere herein.

In some embodiments, a device ID may include a format that can be similar to the format of a bus location (e.g., <bus>-<ID>, in which the ID represents the identifier for the component), although other formats are possible and contemplated herein. Some non-limiting examples of a device ID for devices 204A through 204*n*, respectively, based on an ID that can be represented in a device ID by a reference numeral of the component in FIG. 2 may include, but may not be limited to:

bus-208A0 or bus-212A;
bus-208B2 or bus-212D;
bus-208*n*0 or bus-212E;
bus-208A1 or bus-212B;
bus-208B1 or bus-212C; and
bus-208*nn* or bus-212*n*, among other combinations and/or component IDs that are possible and contemplated herein. Here, the identifiers 212A through 212*n* may represent a bus ID (e.g., a type of bus, bus protocol, etc.) for the buses 212 or a port ID for the ports 208, as discussed elsewhere herein.

In further embodiments, a device ID may include a format of, <bus>-<ID1>:<ID2>, in which ID1 represents an identifier for a first component and ID2 represents an identifier for a second component), although other formats are possible and contemplated herein. Some non-limiting examples of a device ID for devices 204A through 204*n*, respectively, based on two (2) IDs that can be represented in a device ID by a reference numeral of the components in FIG. 2 may include, but may not be limited to:

bus-208A0:212A or bus-212A:208A0;
bus-208B2:212D or bus-212D:208B2;
bus-208*n*0:212E or bus-212E:208*n*0;
bus-208A1:212B or bus-212B:208A1;
bus-208B1:212C or bus-212C:208B1; and
bus-208*nn*:212*n* or bus-212*n*:208*nn*, among other combinations and/or component IDs that are possible and contemplated herein.

In additional embodiments, a device ID may include a format of, <bus>-<ID1>:<ID2>:<ID3>, in which ID1 represents an identifier for a first component, ID2 represents an identifier for a second component, and ID3 represents an identifier for a third component, although other formats are possible and contemplated herein. Some non-limiting examples of a device ID for devices 204A through 204*n*, respectively, based on three (3) IDs that can be represented in a device ID by the reference numeral of the components in FIG. 2 may include, but may not be limited to:

bus-208A0:212A:204A or bus-212A:208A0:204A;
bus-208B2:212D:204B or bus-212D:208B2:204B;
bus-208*n*0:212E:204C or bus-212E:208*n*0:204C;
bus-208A1:212B:204D or bus-212B:208A1:204D;
bus-208B1:212C:204E or bus-212C:208B1:204E; and
bus-208*nn*:212*n*:204*n* or bus-212*n*:208*nn*:204*n*, among other combinations and/or component IDs that are possible and contemplated herein. Here, the identifiers 204A through 204*n* may represent an information ID (e.g., a type of device 204, etc.) for each of the devices 204A through 204*n*, as discussed elsewhere herein.

A device ID, in some embodiments, may include a format of, <bus>-<ID1>:<ID2>:<ID3>:<ID4>, in which ID1 represents an identifier for a first component, ID2 represents an identifier for a second component, ID3 represents an identifier for a third component, and ID4 represents an identifier for a fourth component), although other formats are possible and contemplated herein. Some non-limiting examples of a device ID for devices 204A through 204*n*, respectively, based on four (4) IDs that can be represented in a device ID by the reference numeral of the component in FIG. 2 may include, but may not be limited to:

bus-206A:208A0:212A:204A or bus-206A:212A:208A0:204A;
bus-206B:208B2:212D:204B or bus-206B:212D:208B2:204B;
bus-206*n*:208*n*0:212E:204C or bus-206*n*:212E:208*n*0:204C;
bus-206A:208A1:212B:204D or bus-206A:212B:208A1:204D;
bus-206B:208B1:212C:204E or bus-206B:212C:208B1:204E; and
bus-206*n*:208*nn*:212*n*:204*n* or bus-206*n*:212*n*:208*nn*:204*n*, among other combinations and/or component IDs that are possible and contemplated herein. Here, the identifiers 206A, 206B, . . . 206*n* may represent a respective controller ID for the controllers 206.

As discussed elsewhere, the various device IDs can be used to identify a location 202 where a device 206 resides and/or be based on a location 202. Further, a controller 206 can assign a device ID based on the one or more components coupled to a particular location 202, which can be traced/followed to the particular location 202. For instance, a device ID of bus-206A:208A1:212B or bus-206A:208A1:212B:204D can be used to identify that device 204D is located at bay 210C since the controller 206A knows that port 208A1 and/or bus 212B is coupled to and/or in communication with bay 210C, and/or port 208A1 and/or bus 212B can be traced/followed to bay 210C to find device 204D.

Notably, a device ID, as used herein, can also be considered a location ID, as discussed elsewhere herein. For instance, in the above example bay 210C may include the same identifier and/or one or more ID portions as device 204D (e.g., bus-208A1, bus-212B, bus-208A1:212B, bus-212B:208A1, bus-206A:208A1:212B, bus-206A:212B:208A1, etc.). Further, a computing system 200 may utilize a Logical Unit Number (LUN) to identify a location 202 (e.g., a virtual location 202), which can be utilized as at least a portion of a device ID in additional or alternative embodiments.

In various embodiments, a controller 206 can assign any device 204 residing at a particular location 202 the same device ID. For instance and continuing the above example, if device 204D were hot or cold swapped with a device 204(*n*+1), device 204(*n*+1) may also be assigned bus-208A1, bus-212B, bus-208A1:212B, bus-212B:208A1, bus-206A:208A1:212B, bus-206A:212B:208A1, etc., as its device ID while residing in bay 210C since the device ID may correspond to bay 210C, and not necessarily device 204(*n*+1) and/or device 204D. Alternatively, device 204D may include a device ID of bus-208A1:204D, bus-212B: 204D, bus-208A1:212B:204D, bus-212B:208A1:204D, bus-206A:208A1:212B:204D, bus-206A:212B:208A1: 204D, etc., while residing in bay 210C, while device 204 (*n*+1) may include a device ID of bus-208A1:204(*n*+1), bus-212B:204(*n*+1), bus-208A1:212B:204(*n*+1), bus-212B: 208A1:204(*n*+1), bus-206A:208A1:212B:204D(n+1), bus-206A:212B:208A1:204(*n*+1), etc., while residing in bay 210C, in which the difference may be an information ID for devices 204D and 204(*n*+1) (e.g., a type of device 204), which may or may not be the same depending on the types of device 204 for each of devices 204D and 204(*n*+1).

Figure 3:
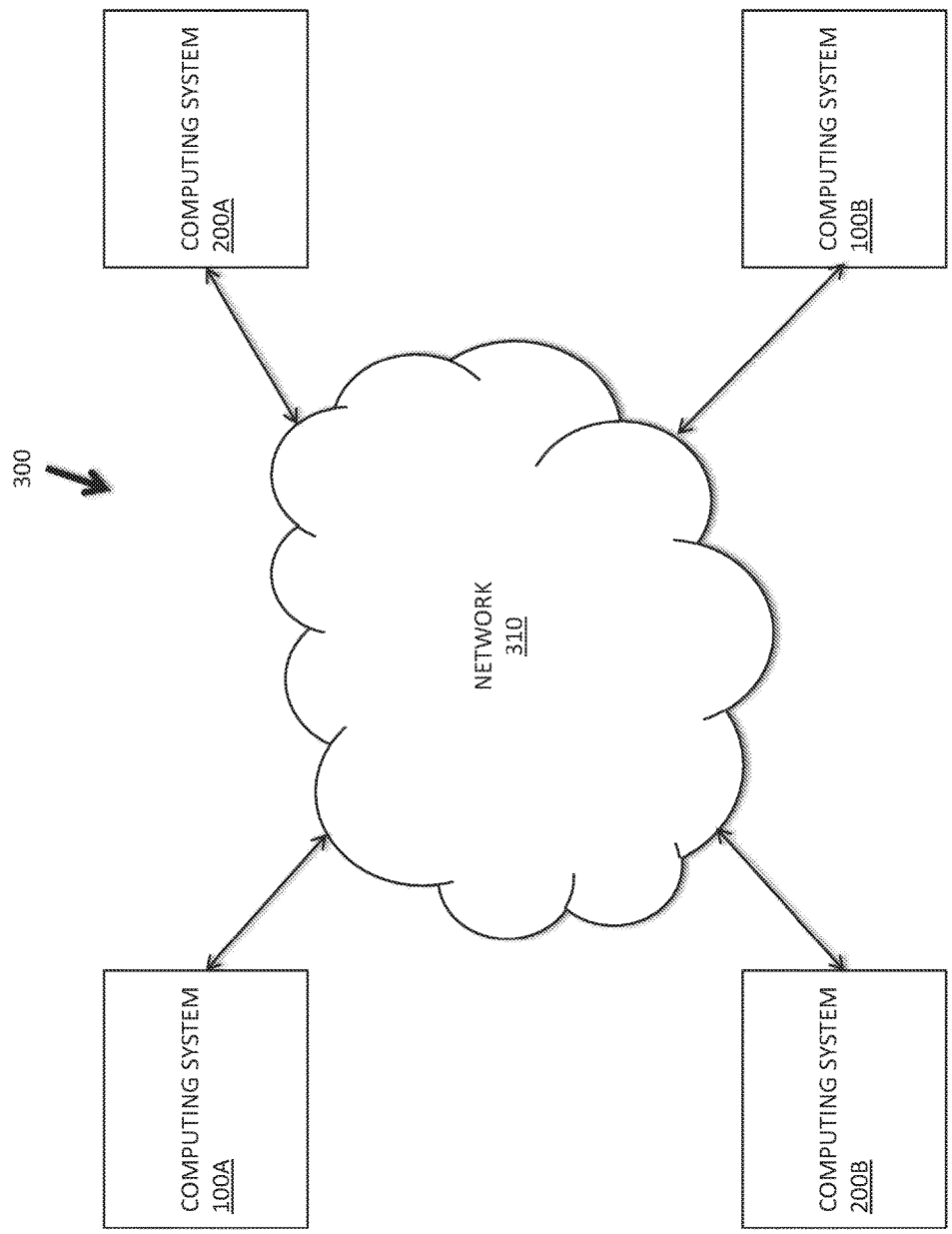
FIG. 3 is a block diagram of an example computing network for identifying a device location in a system or network.

Referring to FIG. 3, FIG. 3 is a block diagram of further example of a network system 300. A network system 300 may be any suitable type of computing system and/or collection of computing devices that is known or developed in the future that can allow multiple computing devices and/or systems to communicate with one another and/or share resources. As shown, the network system 300 may include a set of computing systems 100A, 100B, etc. (also simply referred individually, in various groups, or collectively as computing system(s) 100) that can be similar to the computing system 100 discussed elsewhere herein and a set of computing systems 200A, 200B, etc. (also simply referred individually, in various groups, or collectively as computing system(s) 200) that can be similar to the computing system 200 discussed elsewhere herein coupled to and in communication with one another via a network 310 (e.g., a wired and/or wireless network).

In various embodiments, a network system 300 can comprise a network 310, which can be any suitable type of network that is known or developed in the future that can allow computing systems 100A, 100B, 200A, and 200B, etc., to communicate with one another and/or share resources. Non-limiting examples of networks 310 may include, but may not be limited to, a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of private and/or public computing networks and/or or sets of computing devices that are possible and contemplated herein.

In addition, a network system 300 can include any suitable fabric and/or topology that is known or developed in the future that can enable multiple computing devices and/or systems to communicate with one another and/or share resources. Examples of suitable fabrics and/or topologies include, but are not limited to, a switched fabric topology, a mesh topology, a star topology, a bus topology, a ring topology, and/or a tree topology, etc., among other example fabrics and/or topologies that are possible and contemplated herein.

The device(s) 104 and/or 204 in computing system(s) 100 and/or computing system(s) 200 of network system 300 may include device IDs that may be similar to the various embodiments discussed elsewhere herein. Further, the respective controller 106 and/or controllers 206 in computing system(s) 100 and/or 200, respectively, of network system 300 may generate and/or assign device IDs to the device(s) 104 or 204 in a manner that may be similar to the various embodiments discussed elsewhere herein.

A computing system 100 and/or 200 may include a system identifier, which can be referred to herein as a system ID. In various embodiments, a portion of device ID may include a system ID to assist in identifying a device 104/204 and/or the location 102 where a device 104/204 resides in a network system 300. As used herein, a system ID may be represented as a reference numeral (e.g., 100A, 100B, 200A, 200B, etc.) of its corresponding computing system 100/200.

A device ID in a computing system 100 of network system 300, in various embodiments, may include an identifier of two (2), three (3), or four (4), components (e.g., system ID, a port ID, a bus ID, an information ID, etc.), etc. that may be similar to other embodiments discussed elsewhere herein. The inclusion of a system ID as a portion of a device ID can assist in distinguishing between a device 104 and/or a location 102 where a device 104 resides in a computing system 100A and a device 104 and/or a location 102 where a device 104 resides in a computing system 100B, especially when computing systems 100A and 100B include substantially similar or the same architecture and/or components in which the devices 104 and/or locations correspond to one another in their respective computing systems 100.

Some non-limiting examples of a device ID based on two (2) IDs for computing systems 100A and 100B to distinguish between devices 104 and/or locations 102 where the devices 104 can reside therein may include, but may not be limited to:

bus-100A:112A or bus-100A:108A; and
bus-100B:112A or bus-100B:108A, among other examples that are possible and contemplated herein. Non-limiting examples of a device ID based on three (3) IDs for computing systems 100A and 100B may include, but may not be limited to:

bus-100A:112A:108A or bus-100A:108A:112A; and
bus-100B:112A:108A or bus-100B:108A:112A, among other examples that are possible and contemplated herein. Some non-limiting examples of a device ID based on four (4) IDs for computing systems 100A and 100B may include, but may not be limited to:

bus-100A:112A:108A:104A or bus-100A:108A:112A: 104A; and
bus-100B:112A:108A:104A or bus-100B:108A:112A: 104A, among other examples that are possible and contemplated herein.

A device ID in a computing system 200 of network system 300, in various embodiments, may include an identifier of two (2), three (3), four (4), or five (5) components (e.g., system ID, controller ID, a port ID, a bus ID, an information ID, etc.), etc. that may be similar to other embodiments discussed elsewhere herein. The inclusion of a system ID as a portion of a device ID can assist in distinguishing between a device 204 and/or a location 202 where a device 204 resides in a computing system 200A and a device 204 and/or a location 202 where a device 204 resides in a computing system 200B, especially when computing systems 200A and 200B include substantially similar or the same architecture and/or components in which the devices 204 and/or locations correspond to one another in their respective computing systems 200.

Some non-limiting examples of a device ID based on two (2) IDs for computing systems 200A and 200B to distinguish between devices 204 and/or locations 202 where the devices 204 can reside therein may include, but may not be limited to:

bus-200A:208A0 or bus-200A:212A; and
bus-200B:208A0 or bus-200B:212A, among other examples that are possible and contemplated herein. Non-limiting examples of a device ID based on three (3) IDs for computing systems 200A and 200B may include, but may not be limited to:

bus-200A:208A0:212A or bus-200A:212A:208A0; and
bus-200B:208A0:212A or bus-200B:212A:208A0, among other examples that are possible and contemplated herein. Some non-limiting examples of a device ID based on four (4) IDs for computing systems 200A and 200B may include, but may not be limited to:

bus-200A:208A0:212A:204A or bus-200A:212A:208A0:204A; and
bus-200B:208A0:212A:204A or bus-200B:212A:208A0:204A, among other examples that are possible and contemplated herein. Non-limiting examples of a device ID based on four (4) IDs for computing systems 200A and 200B may include, but may not be limited to:

bus-200A:206A:208A0:212A:204A or bus-200A:206A:212A:208A0:204A; and
bus-200B:206A:208A0:212A:204A or bus-200B:206A:212A:208A0:204A, among other examples that are possible and contemplated herein.

The above examples were selected for use in understanding the various embodiments and should not be construed to limit the scope of a device ID in any manner. Further, while a subset of possible combinations for device IDs is described in the above examples, a person can recognize the concepts employed therein and apply such concepts to the remaining possible combinations of device IDs.

With reference to FIGS. 4A through 4E, example timing diagrams for a portion of a computing system 200 are illustrated therein. At an initial point in time, T0 (FIG. 4A), device 204A may reside in bay 210B and device 204D may reside in bay 210C. Devices 204A and 204D include respective device IDs in accordance with any of the various embodiments discussed elsewhere herein.

At T1 (FIG. 4B), device 204A may be removed from bay 210B, which can include a cold swap, hot swap, and/or other removal technique. Responsive to detecting removal of the device 204A, the device ID associated with the device 204A (and references and/or identities bay 210B) can be released and/or deleted by a controller 206A, and may be reused in the future with a device 204 that may subsequently occupy, reside, or otherwise be coupled/connected to bay 210B. The device 204A may be removed for maintenance, servicing, and/or replacement, etc., among other possible reasons for removal that are contemplated herein.

Figure 4A:
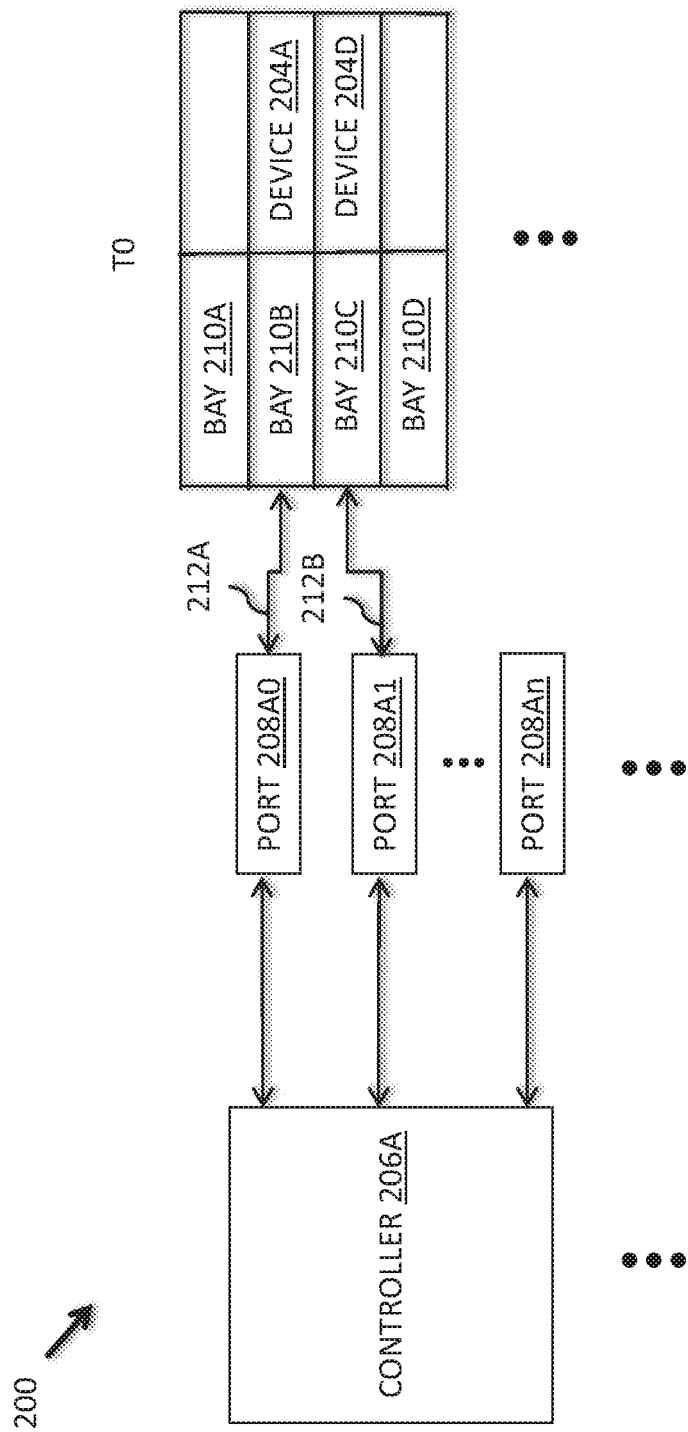
FIGS. 4A through 4E are example timing diagrams of a computing system for identifying a device location in a system or network.
Figure 4B:
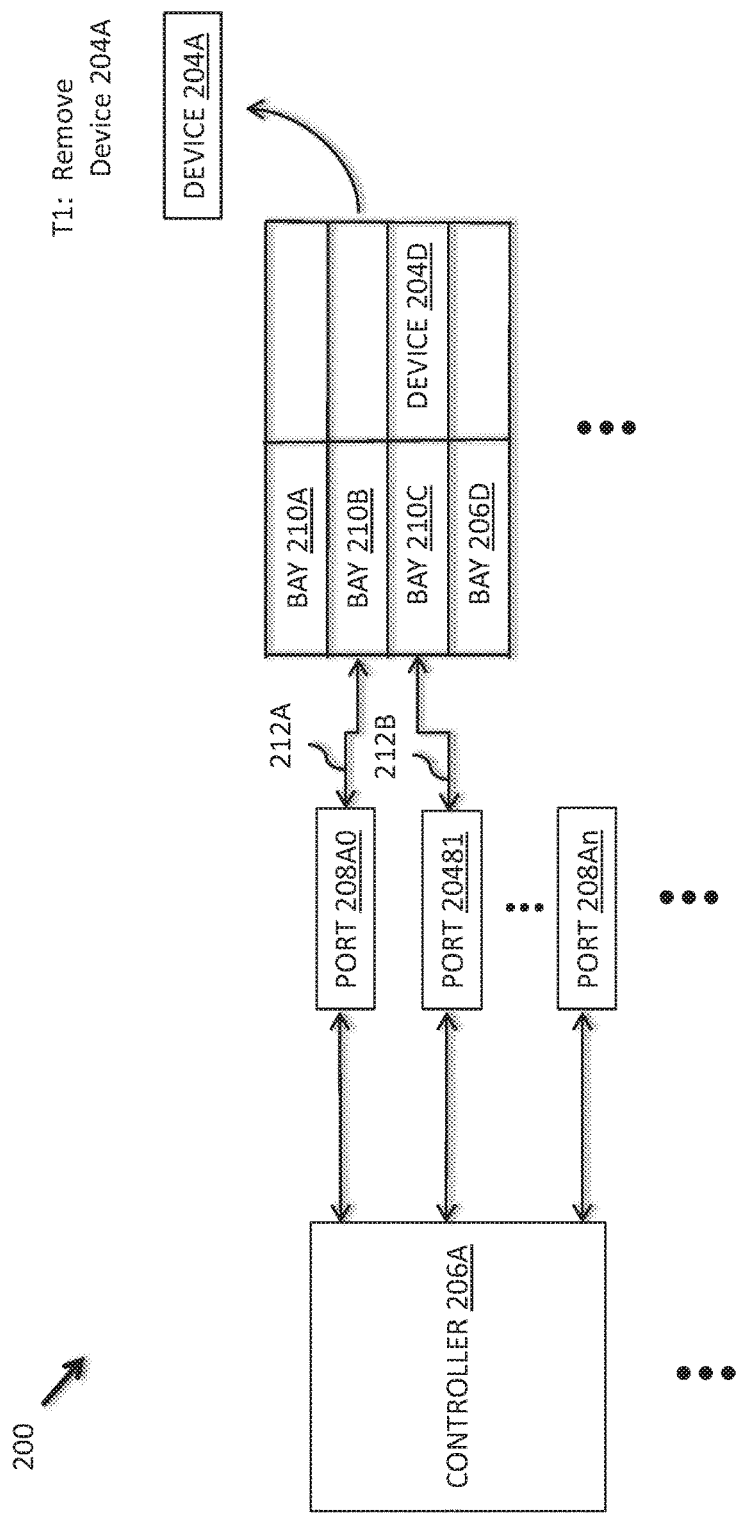
Figure 4C:
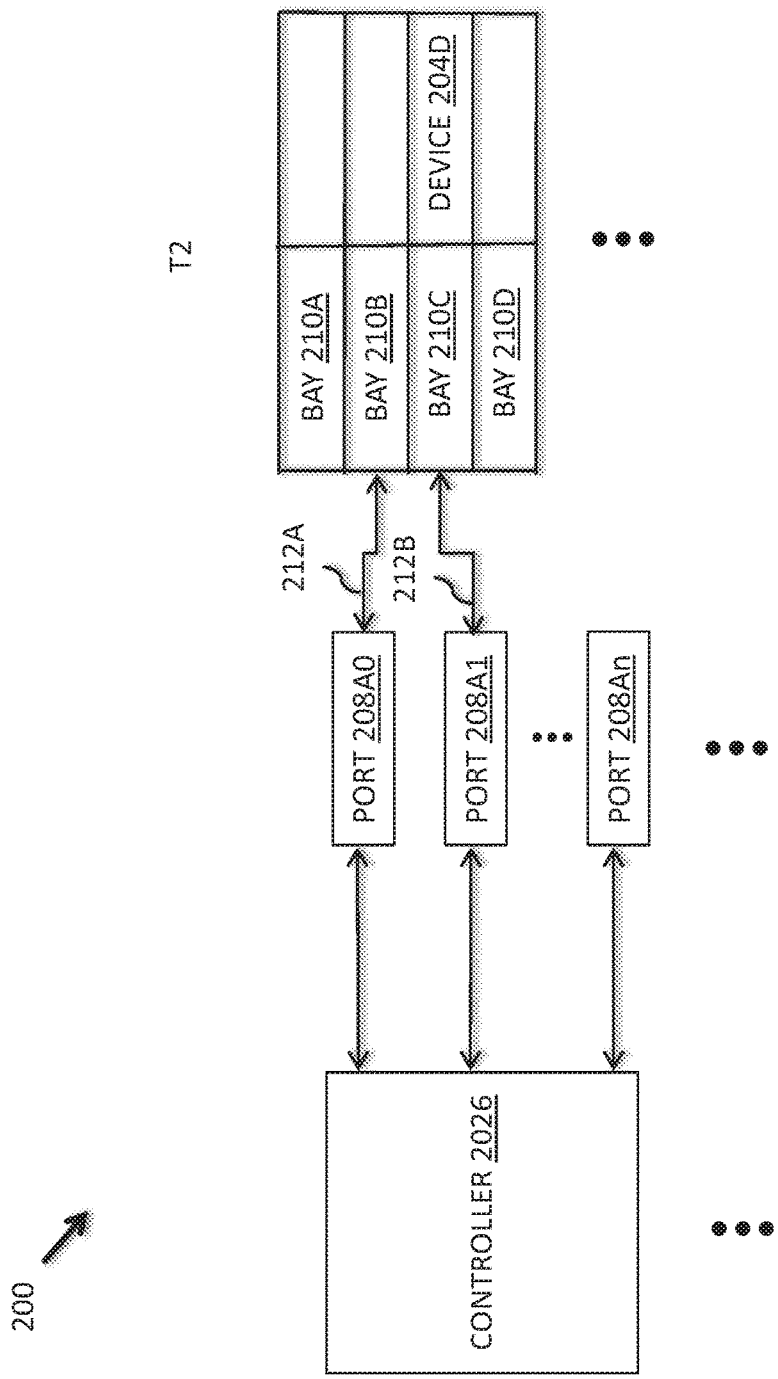
Figure 4D:
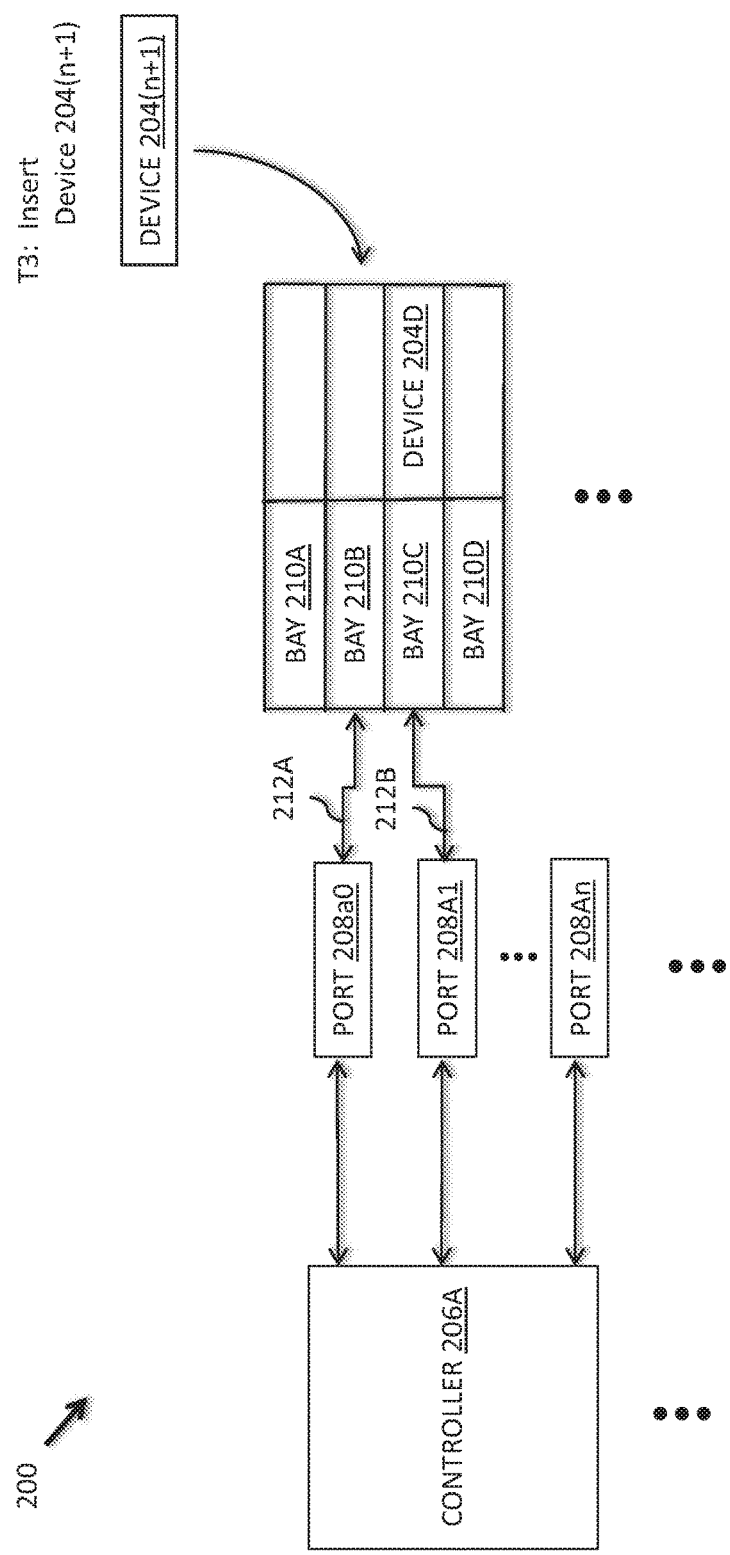
Figure 4E:
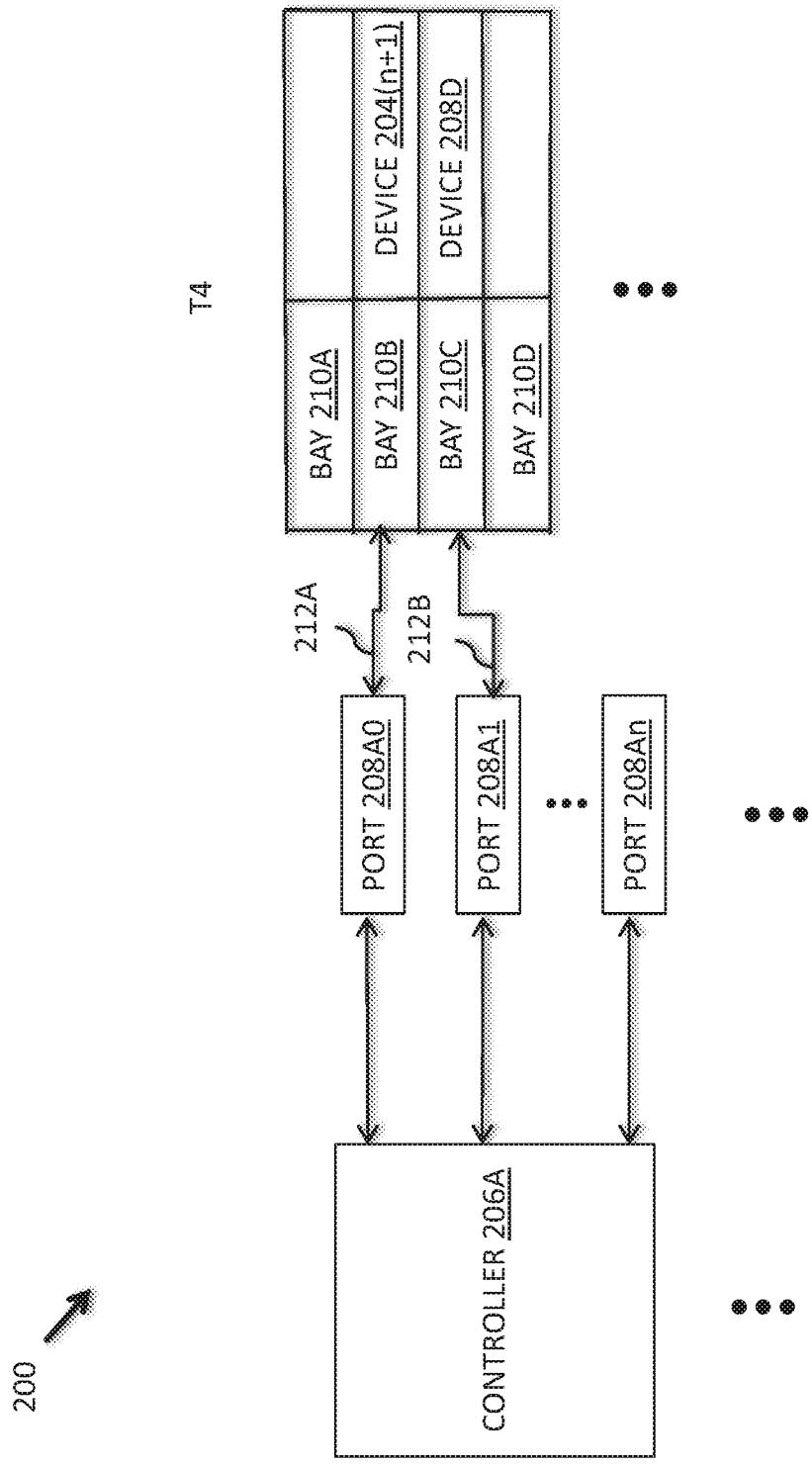

After removal of device 204A, bay 210B may be empty or vacant for a period of time beginning at T2 (FIG. 4C). A device 204(n+1) may be inserted, coupled, attached, connected, etc., at T3 (FIG. 4D). After a time, T4 (FIG. 4E), in response to detecting insertion of the device 204(n+1), the controller 206A may create and/or assign a device ID to the device 204(n+1) using any of the techniques and/or operations discussed elsewhere herein.

The device ID for the device 204(n+1) can be associated with and/or identify the bay 210B within which the device 204(n+1) resides. Further, the device ID for the device 204(n+1) can be the same device ID as the device 204A when the device 204A resided in the bay 210B or one or more portions of the device ID for the device 204(n+1) may be different than one or more portions of the device ID for the device 204A, as discussed elsewhere herein.

Figure 5:
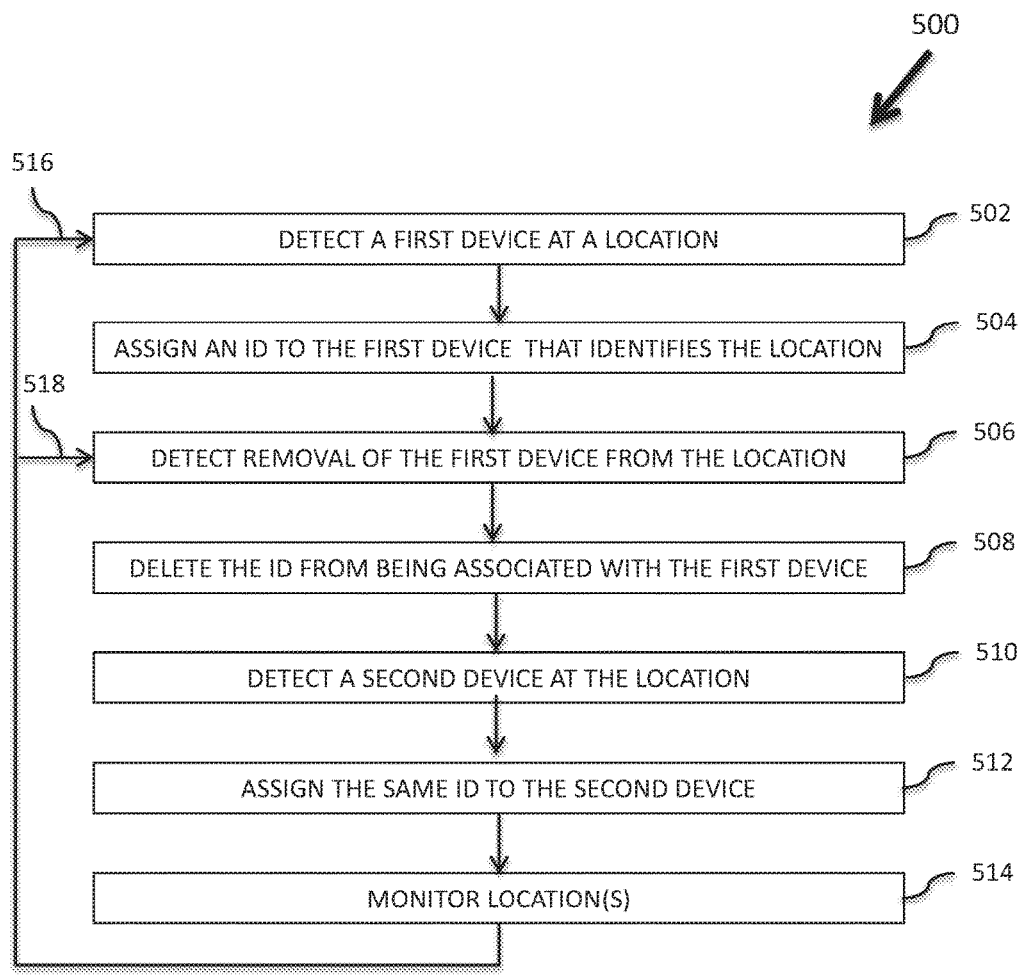
FIG. 5 is a flow diagram of an example method for identifying a device location in a system or network.

Referring to FIG. 5, FIG. 5 is a flow diagram of an example method 500 for identifying a location 102/202 of a device 104/204 in a system 100/200 or network system 300. As shown, method 500 can begin by a controller 106/206 detecting a device 104n/204n being coupled to/residing in a location 102/202 coupled to and/or in communication with the controller 106/206 (block 502).

Responsive to detecting the device 104n/204n, the controller 106/206 may assign a device ID to the device 104n/204n corresponding to the location 102/202 (block 504). A device ID can identify the physical location 102/202 and/or virtual location 102/202 (e.g., a LUN, etc.) where the device 104n/204n currently resides, as discussed elsewhere herein.

Further, a device ID may be based on and/or include a set of IDs associated with components (e.g., a system 100/200, controller(s) 106/206, port(s) 108/208, bus/buses 112/212, and/or information associated with a device 104/204, etc.) or component IDs (e.g., system ID, controller ID, port ID, bus ID, and/or information ID, etc.) included in a computing system 100/200 that can identify and/or be followed to the location 102/202, as discussed elsewhere herein. In various embodiments, a set of component IDs may include and/or be based on one (1) component ID, two (2) component IDs, three (3) component IDs, four (4) component IDs, or five (5) component IDs, etc., as discussed elsewhere herein. In additional or alternative embodiments, a bus ID can identify a communication protocol, as discussed elsewhere herein, employed by a computing bus 112/212.

The method 500 may further include detecting, by the controller 106/206, removal of the device 104n/204n from the location 102/202 (block 506). Responsive to detecting removal of the device 104n/204n, the controller 106/206 may delete the device ID (block 508) (e.g., un-assign the device ID form the device 104n/204n) or otherwise disassociate the device ID from the device 104n/204n.

The controller 106/206 may further detect a device 104(n+1)/204(n+1) being coupled to the location 102/202 (block 510) where the device 104n/204n previously resided. Responsive to detecting the device 104(n+1)/204(n+1), the controller 106/206 can assign or otherwise associate the same device ID to the device 104(n+1)/204(n+1) that was assigned to the device 104n/204n (block 512).

The controller 106/206 can monitor the location(s) 102/202 for insertion(s) and/or deletion(s) (block 514). The controller 106/206 may repeat the operations of blocks 502 through 516 in response to the controller 106/206 detecting a device 104(n+2)/204(n+2) being coupled to a location 102/202 (return 516) and/or may repeat the operations of 506 through 516 in response to detecting that the device 104(n+1)/204(n+1) have been removed from its location 102/202 (return 518).

Figure 6:
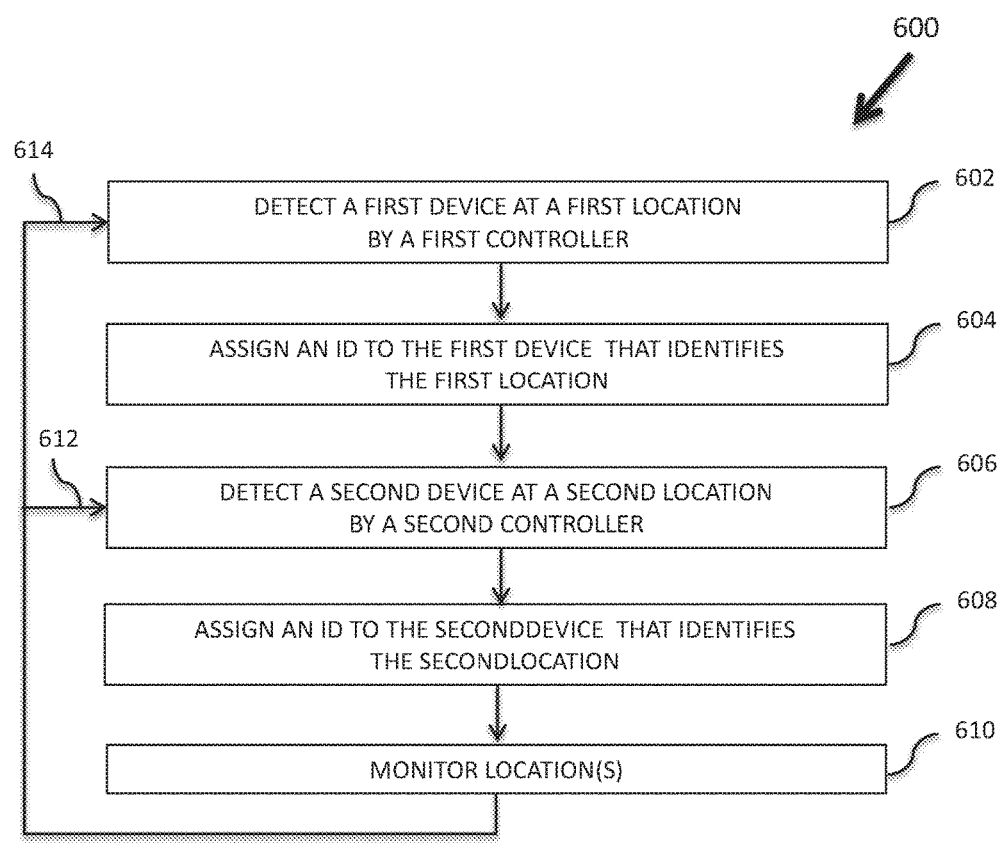
FIG. 6 is a flow diagram of an example method for identifying a device location in a system or network.

With reference to FIG. 6, FIG. 6 is a flow diagram of another example method 600 for identifying a location 202n of a device 204 in a system 200 or network system 300. As shown, method 600 can begin by a controller 206A detecting a device 204n being coupled to/residing in a location 202n coupled to and/or in communication with the controller 206A (block 602).

Responsive to detecting the device 204n, the controller 206A may assign a device ID to the device 204n corresponding to the location 202n (block 604). A device ID can identify the physical location 202n and/or virtual location 202n (e.g., a LUN, etc.) where the device 204n currently resides, as discussed elsewhere herein.

Further, a device ID may be based on and/or include a set of IDs associated with components (e.g., a system 200, controller(s) 206, port(s) 208, bus/buses 212, and/or information associated with the device 204n, etc.) or component IDs (e.g., system ID, controller ID, port ID, bus ID, and/or information ID, etc.) included in a computing system 200 that can identify and/or be followed to the location 202n, as discussed elsewhere herein. In various embodiments, a set of component IDs may include and/or be based on one (1) component ID, two (2) component IDs, three (3) component IDs, four (4) component IDs, or five (5) component IDs, etc., as discussed elsewhere herein. In additional or alternative embodiments, a bus ID can identify a communication protocol, as discussed elsewhere herein, employed by a computing bus 212.

The method 600 may further include detecting, by a controller 206B, a device 204(n+1) being coupled to/residing in a location 202(n+1) coupled to and/or in communication with the controller 206B (block 606). Responsive to detecting the device 204(n+1), assigning a device ID to the device 204(n+1) (block 608). The device ID for the device 204(n+1) can identify the physical location 202(n+1) and/or virtual location 202(n+1) (e.g., a LUN, etc.) where the device 204(n+1) currently resides, as discussed elsewhere herein.

The device ID for the device 204(n+1) may be based on and/or include a set of IDs associated with components (e.g., a system 200, controller(s) 206, port(s) 208, bus/buses 212, and/or information associated with the device 204n, etc.) or component IDs (e.g., system ID, controller ID, port ID, bus ID, and/or information ID, etc.) included in a computing system 200 that can identify and/or be followed to the location 202n, as discussed elsewhere herein. In various embodiments, a set of component IDs may include and/or be based on one (1) component ID, two (2) component IDs, three (3) component IDs, four (4) component IDs, or five (5) component IDs, etc., as discussed elsewhere herein. In additional or alternative embodiments, a bus ID can identify a communication protocol, as discussed elsewhere herein, employed by a computing bus 212. In various embodiments, one or more component IDs included in the device ID for the device 204n is different than one or more component IDs included in the device ID for the device 204(n+1).

The controllers 206A and 206B may monitor the location(s) 202 (block 610). Further, the controller 206B may detect another device 204 at a location 202 and method 600 can return to block 606 (return 612). In addition, the controller 206A may detect another device 204 at a location 202 and method 600 can return to block 602 (return 614).

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a LAN or a WAN, Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a set of storage locations; and
a first controller including a set of first ports coupleable to the set of storage locations and comprising respective port identifiers (IDs), the first controller including one or more first processing devices for executing instructions in one or more applications configured to cause the first controller to perform first operations comprising:
responsive to detecting a first device being coupled to a first port in the set of first ports,
assigning a first device ID to the first device based on a first port ID associated with the first port, wherein the first device ID:
identifies one of a first physical location and a first virtual location in the set of storage locations for the first device; and
includes:
the first port ID associated with the first port; and
a first information ID for the first device that identifies a device type for the first device.

2. The system of claim 1, wherein the first device ID further includes a protocol ID for a protocol coupling the first device and the first port.

3. The system of claim 1, the first operations further comprising:
responsive to detecting removal of the first device, unassigning the first device ID; and
responsive to detecting a second device being coupled to the first port, assigning the first device ID to the second device, wherein the first device ID identifies the first physical location in the set of storage locations for the second device.

4. The system of claim 1, further comprising:
a second controller including:
a set of second ports coupleable to the set of storage locations and comprising respective port IDs, the second controller including one or more second processing devices for executing instructions in the one or more applications configured to cause the second controller to perform second operations comprising:
responsive to detecting a second device being coupled to a second port in the set of second ports, assigning a second device ID to the second device based on a second port ID associated with the second port, wherein the second device ID:
identifies one of a second physical location and a second virtual location in the set of storage locations for the second device; and
includes a second port ID associated with the second port.

5. The system of claim 4, wherein:
a first portion of the first device ID includes the first port ID;
a second portion of the first device ID includes the first information ID;
the second device ID further includes a second information ID for the second device that identifies a second device type for the second device;
a first portion of the second device ID includes the second port ID; and
a second portion of the second device ID includes the second information ID.

6. The system of claim 5, wherein:
the first device ID further includes a first protocol ID for a first protocol coupling the first device and the first port;
a third portion of the first device ID includes the first protocol ID;
the second device ID further includes a second protocol ID for a second protocol coupling the second device and the second port; and
a third portion of the second device ID includes the second protocol ID.

7. The system of claim 4, wherein:
the first device ID further includes a first protocol ID for a first protocol coupling the first device and the first port; and
the second device ID further includes a second protocol ID for a second protocol coupling the second device and the second port.

8. A method, comprising:
detecting, by a first controller, a first device being coupled to a first location of a set of locations coupled to the first controller; and
responsive to detecting the first device, assigning a first device identifier (ID) to the first device, wherein:
the first device ID is based on a set of first component IDs corresponding to first components associated with the first device;
at least one first component ID in the set of first component IDs is one of a first system ID, a first controller ID, a first port ID, and a first bus ID associated with the first location;
at least one first component ID in the set of first component IDs is one of:

a first information ID for the first device that identifies a device type for the first device; and
a first protocol ID for a protocol coupling the first device and a first port; and
the first device ID identifies the first location where the first device resides.

9. The method of claim 8, wherein the first device ID includes:
the first information ID; and
the first protocol ID.

10. The method of claim 8, wherein the first device ID includes the first port ID for a first port for the first location.

11. The method of claim 8, wherein the first device ID includes:
the first system ID associated with the first location;
the first controller ID associated with the first location;
the first port ID associated with the first location; and
the first bus ID associated with the first location.

12. The method of claim 11, wherein the first device ID includes:
the first information ID; and
the first protocol ID.

13. The method of claim 8, wherein:
the first device ID includes the first bus ID; and
the first bus ID identifies a communication protocol employed by a computing bus for the first location.

14. The method of claim 8, further comprising:
detecting, by the first controller, removal of the first device from the first location;
responsive to detecting removal of the first device, un-assigning the first device ID from the first device;
detecting, by the first controller, a second device being coupled to the first location; and
responsive to detecting the second device, assigning the first device ID to the second device.

15. The method of claim 8, further comprising:
detecting, by a second controller, a second device being coupled to a second location of a set of locations coupled to the second controller; and
responsive to detecting the second device, assigning a second device ID to the second device,
wherein:
the second device ID is based on a set of second component IDs corresponding to second components associated with the second device; and
the second device ID identifies the second location where the second device resides.

16. The method of claim 15, wherein:
a second component ID is one of a second system ID, a second controller ID, a second port ID, a second bus ID, and a second information ID associated with the second device; and
at least one first component ID in the set of first component IDs is different than at least one second component ID in the set of second component IDs.

17. A system, comprising:
a set of device locations;
a set of first ports coupleable to the set of device locations and comprising respective port identifiers (IDs);
means for detecting a first device being coupled to a first port in the set of first ports; and
means for assigning, responsive to detecting the first device, a first device ID to the first device, wherein the first device ID:
identifies a first location in the set of device locations for the first device; and
includes:
a first port ID associated with the first port; and
a first information ID for the first device that identifies a device type for the first device.

18. The system of claim 17, wherein the first device ID further includes a protocol ID for a protocol coupling the first device and the first port.

19. The system of claim 18, wherein the first device ID further includes:
a first system ID associated with the first location;
a first controller ID associated with the first location; and
a first bus ID associated with the first location.

20. The system of claim 17, further comprising:
means for un-assigning, responsive to detecting removal of the first device, the first device ID; and
means for assigning, responsive to detecting a second device being coupled to the first port, the first device ID to the second device, wherein the first device ID identifies a first physical location in the set of device locations for the second device.

* * * * *